Patented Oct. 10, 1933

1,930,449

UNITED STATES PATENT OFFICE 1,930,449

AMYLBENZOIC ACID AND PROCESS FOR PREPARING SAME

Herman A. Bruson, Jack D. Robinson, and Otto Stein, Philadelphia, Pa., assignors to The Resinous Products & Chemical Co. Inc., Philadelphia, Pa., No Drawing. Application July 25, 1931
Serial No. 553,168

8 Claims. (Cl. 260—108)

This invention describes a method for preparing amylbenzoic acid, more particularly the compound which is believed to be p-(2-amyl)-benzoic acid, a new substance having the formula

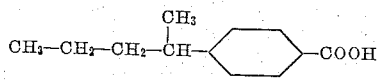

One object of this invention is to produce p-(2-amyl)-benzoic acid in good yield by an economical process. Another object of this invention is to produce a technical mixture of isomeric amylbenzoic acids containing any possible isomers, i. e. not only the secondary amyl group but also the tertiary amyl group, iso-amyl group and so forth, as well as the ortho substituted benzoic acids. These acids are to be used primarily for the manufacture of their polyvalent metal salts which are efficient siccatives for drying oil compositions as set forth in a copending application of applicant Bruson, Serial No. 381,632, and in the pharmaceutical and dyestuffs industry.

The above acids may be prepared according to the present invention by treating for example, para-amylacetophenone,

with hot alkaline hypochlorite or hypobromite solution. The amyl acetophenones used for this purpose are new compounds, the manufacture and properties of which are described in a copending patent application Serial No. 537,496.

The following illustrates the manner of preparing amylbenzoic acid.

Example 1

In a vessel equipped with a vigorous stirrer and efficient reflux condenser is placed a solution of sodium hypochlorite, prepared by absorbing 82 grams of chlorine in a solution of 125 grams sodium hydroxide in 750 cubic centimeters of water.

Sixty grams p-(2-amyl)-acetophenone are then added and the mixture carefully heated with continual stirring to about 95° C. A vigorous exothermic reaction sets in which is controlled by outside cooling so that it does not become too violent, but continues to boil of its own accord. Chloroform is thereby split off and the amylacetophenone goes into solution. The reaction continues for about six hours at 70–75° C. It is finally boiled for about two hours to complete the reaction. Upon cooling, any oily material is separated and the clear alkaline solution acidified with dilute sulfuric acid. p-(2-amyl)-benzoic acid separates out as a yellowish oil which is taken up in any suitable organic solvent which is immiscible with water, such as ether, benzene, naphtha, or ethylene dichloride. Upon evaporation of the solvent and fractionation of the residual oil in vacuo, p-(2-amyl).-benzoic acid comes over as an almost colorless somewhat viscous oil, which crystallizes only with difficulty and boils at 140° C. under 3 m. m. pressure of mercury. The yield varies from 65 to 75% of the theoretical. It is readily soluble in almost all organic solvents such as alcohol, petroleum ether, benzene, acetone, chloroform but is practically insoluble in water. Its polyvalent metal salts such as the aluminum, antimony, barium, bismuth, cadmium, calcium, cerium, chromium, cobalt, copper, iron, lead, magnesium, manganese, mercury, strontium, nickel, thallium, tin, titanium, uranium, vanadium, and zinc salts are characterized by the fact that they are practically insoluble in water and readily soluble in a variety of organic solvents, notably benzene, solvent naphtha, turpentine, ethyl acetate, toluene, and in oils such as linseed oil and other drying and semi-drying oils.

Example 2

Instead of using p-(2-amyl)-acetophenone as described in Example 1 above, one may use the same quantity of mixed isomeric amyl-acetophenones which is a liquid boiling at 133–136° C. at 8 m. m.

It is obtained by first condensing benzene with the mixed amyl monochlorides or amyl alcohols ("Pentasol") derived from the chlorination of pentane. This mixture contains both primary-, secondary-, tertiary-, and iso-amyl benzenes which upon further treatment with acetyl chloride or acetic anhydride and anhydrous aluminum chloride forms mixed amyl-acetophenones. These are described in a copending application Serial No. 537,496.

The mixed amylbenzoic acids obtained therefrom in accordance with the process described in Example 1, have a boiling point range of 150–160° C. at 4 m. m. pressure. Physically and chemically this mixture resembles p-(2-amyl)-benzoic acid, of which it contains a considerable amount. Upon refractionation it yields a main fraction boiling at 155–157° C./4 m. m.

Its polyvalent metal salts possess the same unique solubilities as described in Example 1.

Example 3

A sodium hypochlorite solution was prepared by treating a suspension of 328 gr. calcium hypochlorite containing 65% available chlorine (the commercial product known as "HTH") in 500 ccm. of water, with a solution of 400 grams sodium carbonate in 1¼ liters of water, and filtering off the calcium carbonate. The clear filtrate contains sodium hypochlorite in amount sufficient to effectively oxidize 95 grams of mixed isomeric amyl-acetophenones. The oxidation was carried out by mixing 95 gr. of amyl-acetophenone (mixed isomers) with 200 ccm. of this sodium hypochlorite in a 3 liter vessel fitted with stirrer and reflux condenser. The mixture was heated to 90–100° C. until the reaction started. Heat was then shut off and the remainder of the hypochlorite solution allowed to run in slowly so that the mixture kept refluxing due to its own heat of reaction. After about 25 hours the reaction was completed. The colorless clear solution was separated from any chloroform and the amylbenzoic acid was precipitated by the addition of dilute sulfuric acid. The yield was 70% of the theoretical of mixed amylbenzoic acid isomers boiling at about 155° C./4 m. m.

By using 95 grams of p-(2-amyl)-acetophenone in the above reaction, p-(2-amyl)-benzoic acid was obtained in 60% yield, boiling at 140° C./3 m.m.

Example 4

95 grams p-(2-amyl)-acetophenone is treated under reflux with an alkaline hypobromite solution prepared by treating a solution of 216 gr. sodium hydroxide in 2 liters water with 288 gr. bromine at 5–10° C. The materials react vigorously at 80–95° C. When the reaction has moderated, the mixture is boiled four to five hours to complete the reaction. Any excess of hypobromite is then destroyed by adding a solution of sodium bisulfite. The bromoform is removed and the clear filtrate acidified with dilute mineral acid. The p-(2-amyl)-benzoic acid is removed and fractionated as above in vacuo. The yield is 69% of theoretical.

In the above reactions the sodium hypochlorite may be replaced by any alkaline hypochlorite or hypobromite in alkaline solution, e. g. potassium or calcium hypochlorite. In the latter case, insoluble calcium salts are formed which hinder the reaction so that it is preferable to use the sodium or potassium hypohalite.

The amyl-acetophenone may be replaced by an equivalent amount of any other amyl-substituted acetophenone such as amyl-methyl-acetophenone, amyl-ethyl acetophenone, amyl-chlorphenyl-methyl ketone and the like.

The quantity of hypochlorite or hypobromite is preferably from 10 to 50% in excess of the theoretical quantity required assuming that one mole of the ketone requires three moles of hypohalite in accordance with the following reaction:

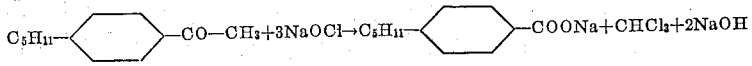

What we claim is:

1. As a new compound, p-(2-amyl)-benzoic acid.

2. As a new composition of matter, a mixture of isomeric amylbenzoic acids containing p-(2-amyl)-benzoic acid as the principal component.

3. In the process for preparing amylbenzoic acid, the step which comprises reacting an amyl-acetophenone in an alkaline solution with a salt of a member of the group consisting of hypochlorous and hypobromous acids.

4. In the process for preparing amylbenzoic acid, the step which comprises reacting an amyl-acetophenone with alkaline sodium hypochlorite solution.

5. In the process for preparing p-(2-amyl)-benzoic acid, the step which consists in boiling p-(2-amyl)-acetophenone with reacting proportions of alkali metal hypochlorite solution and thereafter acidifying the mixture.

6. In the process for preparing mixed isomeric amyl benzoic acids, the step which consists in boiling mixed isomeric amyl acetophenones with reacting proportions of alkali metal hypochlorite solution and thereafter acidifying the mixture.

7. As a new compound p-(2-amyl)-benzoic acid boiling at about 140° C. under 3 m.m. pressure and characterized in that its anhydrous neutral lead salt is readily soluble in benzene.

8. As a new composition of matter, mixed isomeric amylbenzoic acids boiling substantially at 133–136° C. under 8 m.m. pressure, said mixture containing p-(2-amyl)-benzoic acid as the principal component, and characterized in that its anhydrous neutral lead salt is readily soluble in benzene.

HERMAN A. BRUSON.
JACK D. ROBINSON.
OTTO STEIN.